May 12, 1953  A. H. DEWEES  2,638,154
CONSTRUCTION IN UPHOLSTERED ARTICLE SUCH AS A SEAT
Filed April 17, 1950  3 Sheets-Sheet 1
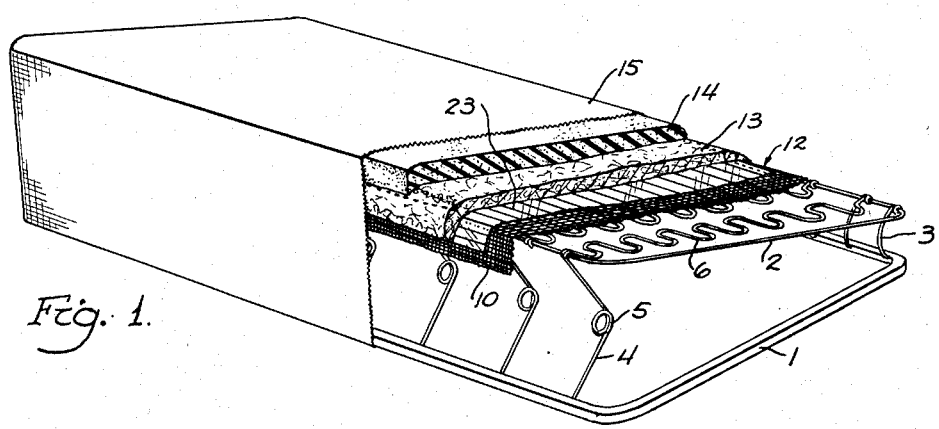
Fig. 1.
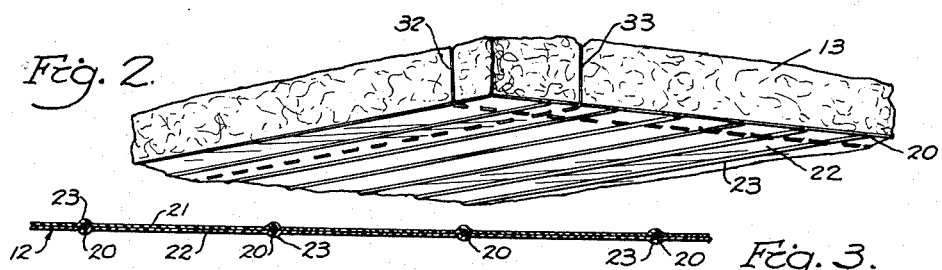
Fig. 2.
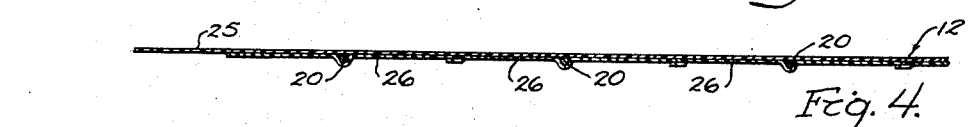
Fig. 3.
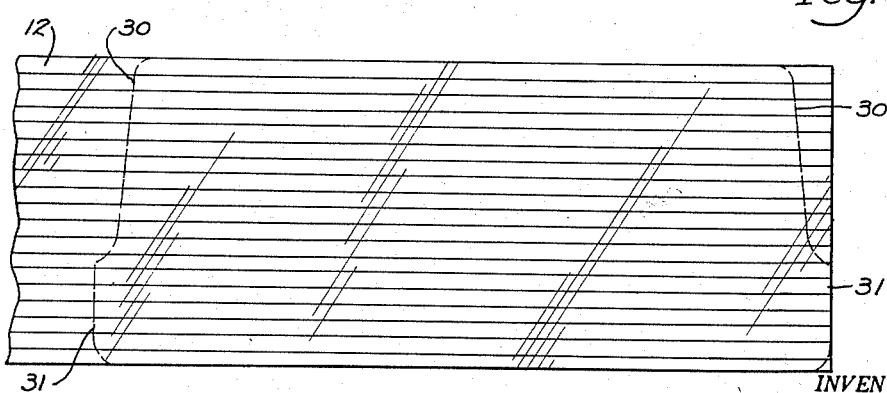
Fig. 4.
Fig. 5.
INVENTOR.
Alexander H. Dewees
BY
Barnes Kisselle Laughlin & Raisch
Attorneys.

May 12, 1953 A. H. DEWEES 2,638,154
CONSTRUCTION IN UPHOLSTERED ARTICLE SUCH AS A SEAT
Filed April 17, 1950 3 Sheets-Sheet 2

INVENTOR.
Alexander H. Dewees
BY
Barnes Kisselle Laughlin & Raisch
Attorneys.

Patented May 12, 1953

2,638,154

UNITED STATES PATENT OFFICE 2,638,154

CONSTRUCTION IN UPHOLSTERED ARTICLE SUCH AS A SEAT

Alexander H. Dewees, Detroit, Mich.

Application April 17, 1950, Serial No. 156,245

2 Claims. (Cl. 155—181)

This invention relates to seats, chairs, davenports, couches and the like, of the type having a spring under structure covered with upholstery usually in the form of some padding and an exterior trim material.

The invention is applicable to the seat structure of automotive vehicles and will be disclosed specifically with reference thereto, although the invention is, as above mentioned, applicable to any sort of furniture with an inner spring structure including mattresses with springs. When reference is made to a seat structure of an automobile the term includes both the portion of the seat upon which the passengers sit, and as well as the portion of the seat which constitutes the back.

In such upholstered devices, it is necessary, in order to provide the best construction, to have a platform or padding support between the spring structure and the padding which covers the same. Otherwise, the spring structure in time embeds itself into the soft padding. This platform or pad, however, must be of a flexible nature else it interferes with the yielding functions of the underlying spring structure. Various pads or platform constructions have been heretofore employed and one example where a length of wire of flexing or yielding characteristics, somewhat in the nature of a spring wire, is fashioned, for example, into serpentine form, and interlaced with or attached to a sheet of material such as burlap. This is a rather costly thing and inasmuch as the seats of automobiles are of different shapes and are not uniformly rectangular or square, the platform to be used with a given seat must be more or less tailored to the shape of that seat. For example, some seats in automotive vehicles extend completely across the vehicle; other seats of the foldable variety are divided in the middle, and so on. Moreover, the platform must be held in position against shift so as not to expose the spring structure to the padding.

An object of the present invention is to provide an improved platform member for use between the spring structure and the padding of an upholstered article. The platform of the present invention is one which need not be tailored to particular seat designs but can be made of long lengths and cut to size. The platform structure further resides in tensile elements of a flexible nature which give the platform tensile strength and the tensile elements are held so that a plurality of lengths thereof may be maintained spaced from each other and held against longitudinal displacement relative to each other. The platform of the present invention may be stitched to the padding. In some instances, the platform may embody lengths of tensile elements associated with a body sheet adhered thereto so that each length of the tensile material is held thereby against longitudinal shift.

The invention is disclosed in the accompanying drawings:

Fig. 1 is a cut away view with some parts in section showing a seat structure of the type used in automotive vehicles.

Fig. 2 is a view illustrating the padding and a platform stitched thereto.

Fig. 3 is an enlarged cross sectional view illustrating the yarn embodied between plastic sheets.

Fig. 4 is a view similar to Fig. 3 showing another form.

Fig. 5 is a schematic view illustrating how the platform may be used with a seat having an irregular contour.

Figure 6:
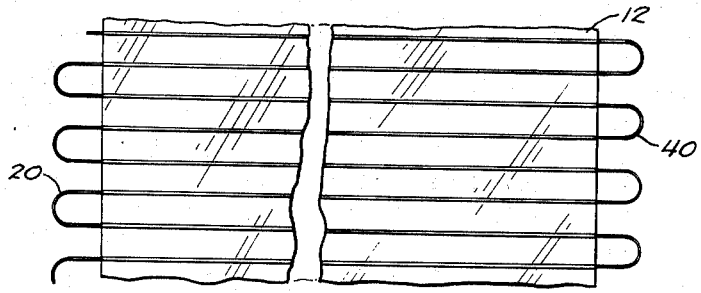
Fig. 6 is a view illustrating the platform of the present invention with loops in the yarn for tie-down purposes.

The seat structure, as shown in Fig. 1, is of the type having zig-zag springs and the structure shown is one suitable for a seat in an automotive vehicle. There is a base frame 1, an upper frame 2, connected together by spring elements 3 at the rear edge and by spring elements 4 at the forward edge. The spring elements 4 each have a helical loop 5 which adds to the flexibility. Extending across the frame 2 are a plurality of zig-zag spring elements 6 which yieldably support the weight on the seat. Indeed, each group of elements 3, 4 and 6 may all comprise one single length of suitable spring wire.

The upholstery for this basic spring structure may include a piece of fabric of rough material such as burlap 10 disposed in contact with the spring structure and overlying the burlap is the platform of the present invention which is generally illustrated at 12. Overlying the platform is the soft padding which may be of cotton in the nature of a loose cotton felt as shown at 13. As shown, there is a layer of sponge rubber 14 placed over the padding 13 and finally is the exterior trim material 15 usually a material such as broadcloth, velour, mohair, whipcord, leather or the like.

The platform, as shown in Figs. 1 and 2, comprises a plurality of lengths or runs of tensile material. These lengths are shown at 20 and may be of what is known as plastic yarn having some elastic characteristics and yet of strong strength. This yarn may be any one of a number of co-polymers of vinylidene chloride and vinyl chloride. A plastic product now on the market known as "Saran" is a good example; nylon is another example.

As shown in Fig. 1 the tensile elements are parallel to each other and are associated with each other by a sheet of material. The tensile elements and the sheet may be considered as being of plastic and the tensile elements and sheet may be arranged together in different ways. As shown in Fig. 3, there are two sheets 21 and 22 disposed in face to face relationship with the runs of the yarn therebetween. The yarn, of course, causes the sheets of material to be bulged out at the location of the runs of yarn, and as indicated in Fig. 3, each sheet is partially formed about the yarn thus providing a rib-like structure 23 indicated by the lines of Fig. 1. The sheet may likewise be any one of a number of co-polymers of vinylidene chloride and vinyl chloride or poly ethylene. The product known as "Saran" is highly satisfactory. The body sheets, however, may be a woven plastic.

In Fig. 4 one sheet is used as shown at 25 with a tape or ribbon 26 for each tensile element. In Fig. 4, the tape is fashioned about the tensile elements thus providing a bulge or rib formation while the sheet 25 remains substantially flat. Of course, in the form shown in Fig. 3, one sheet could be flat and the other sheet fashioned about the tensile elements.

In each case, however, the two sheets, or the single sheet and the tapes, are permanently adhered together with a suitable cement and are likewise adhered to the tensile elements. The plastic yarn may be a monofilament that is, a body comprised of one integral piece or the yarn may be a multi-filament, that is, a length of material constituted by a plurality of smaller lengths woven or twisted together.

At the present time it is believed that the use of the plastic yarn and the plastic sheets are preferred but, in any event, the tensile elements are strongly adhered to the sheet to prevent longitudinal shift thereof.

This structure provides a flexible platform of a yielding nature which will not interfere with the spring action of the underlying spring structure and yet of great tensile strength particularly in the direction lengthwise of the yarn or other tensile element, the strength being provided largely by the tensile elements although the sheets contribute to the tensile strength.

Platform structure of this type may be made in endless lengths and formed and shipped in coils if desired. As a result, lengths may be cut from the coil for application to a seat structure. This is demonstrated in Fig. 5 which shows the outline of a seat structure in plan view by the dotted lines 30 where it will be noted that the seat has a projecting portion 31 at each side. Such a shape may be provided in order to accommodate for an arm rest at the more narrow portions of the seat. In applying the platform to a seat structure, a suitable size of platform material may be taken and stitched directly to the padding 13. The platform may be stitched to the padding by stitches running across the ends of the padding shown at 32 and by stitches running lengthwise along the side edges as shown at 33. If desired the underlying burlap piece 10 may also be stitched to the padding and platform.

With such a structure, the platform is thus held in position. The several runs of tensile material cannot slip lengthwise or be displaced lengthwise relative to the sheets because the same are cemented thereto. Accordingly, since the entire platform sheet is stitched to the padding material it cannot become displaced and yet each individual length of yarn or other tensile element performs its function in tension as a weight or load is placed upon the upholstered cushion structure. The platform body yields in any direction, the same being capable of stretching both lengthwise and crosswise thus not interfering with the function of the springs, while at the same time it has adequate body and rigidity to keep the springs 6 and other metal portions of the structure from embedding into or cutting into the soft cushion material.

Figure 7:
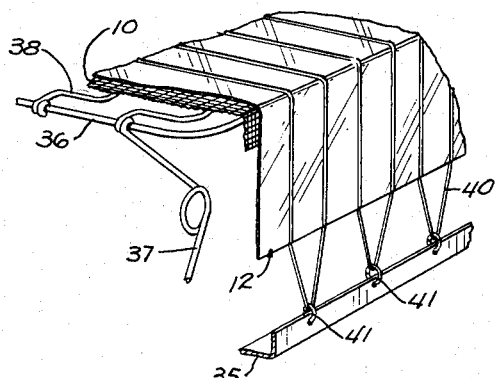
Fig. 7 is a view partly in section and with parts cut away illustrating a structure where the platform is tied down.
Figure 9:
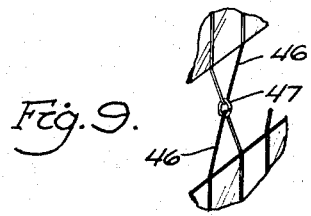
Fig. 9 is an enlarged detailed view illustrating the tying arrangement of Fig. 8.
Figure 8:
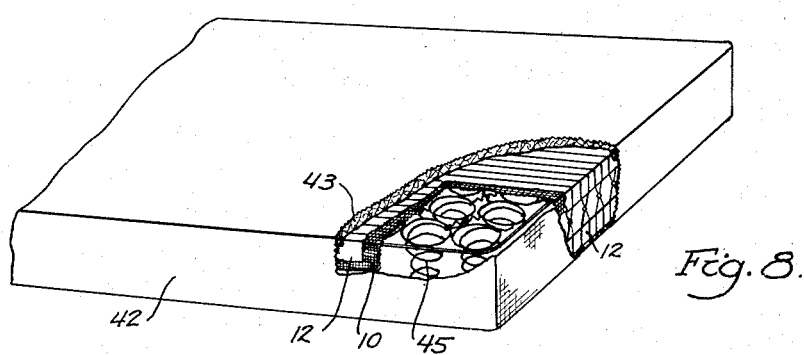
Fig. 8 is a view with parts cut away and parts in section illustrating a structure, such as a mattress with springs therein.

There may be cases where, due to the nature of the structure in question, or the desires of the manufacturer or user, that a tie-down is necessary as shown in Fig. 7. Here the spring structure is shown as embodying a lower frame member 35 and an upper frame member 36 with intermediate yieldable members 37 and crosswise extending spring elements 38. The platform 12 may be formed as shown in Fig. 3 or 4. In this case, the tensile elements may be fashioned into serpentine coil form with loop-like extensions 40 (Fig. 6). When this platform is placed over an underlying spring construction, as shown in Fig. 7, the several loops may be tied down by tying devices conventionally called hog rings 41. Such a ring is a split metal ring which is passed through a loop and through an opening in the frame 35 and closed by a suitable tool. The mattress structure, shown in Fig. 8, has coiled spring 45. The outside covering is illustrated at 42, the padding at 43, and the platform of the present invention generally illustrated at 12. In this form, both faces of the mattress structure may be equipped with the platform of the present invention, as indicated and the platforms may be formed with loops 46 and the loops may be brought into proximity to each other and secured by the so-called hog rings 47 as described. As shown in both Fig. 7 and in Fig. 8, a sheet of material such as burlap or other rough or strong material such as cotton or the like, may be disposed between the spring structure and the platform structure, the burlap carrying the same reference character 10 as is given to it in Fig. 1.

Figure 10:
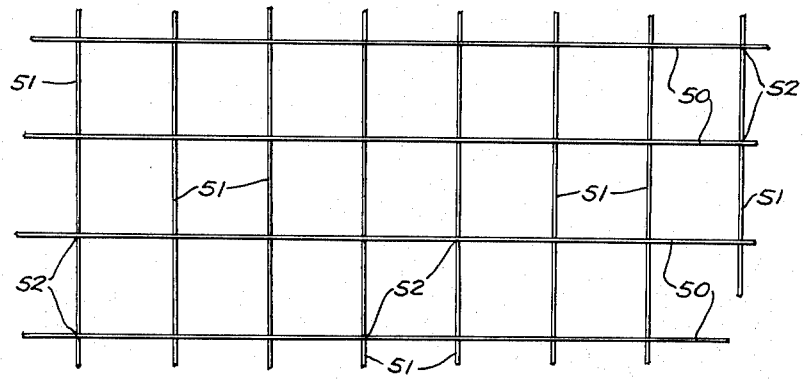
Fig. 10 is a view of a modified form of platform comprised of a mesh.
Figure 11:
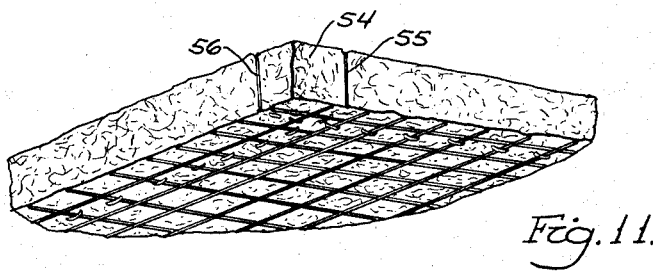
Fig. 11 is a view illustrating the mesh platform of Fig. 10 stitched to padding.

A modified form of platform is shown in Fig. 10. This is of the mesh type and comprises yarn of plastic or other tensile elements, as above mentioned, fashioned into the form of a mesh having, for example, tensile elements 50 and 51 arranged in mesh form. The mesh may be woven in any suitable manner or the individual lengths of material, especially where the same are of plastic, may be fused or cemented together at the locations of intersection as illustrated at 52. Such a platform may be stitched to the padding in a manner similar to that shown in Fig. 2, the padding being shown in Fig. 11 at 54 with mesh stitched thereto along the edges of the padding as shown at 55 and 56. The stitches may not directly engage each individual run of the material of the mesh but since the tensile elements are united a sufficient hold is obtained to prevent the pad, as a whole, from shifting.

Figure 12:
Fig. 12 is a view illustrating the mesh-type of structure associated with a body sheet.

The mesh construction may also be employed with one or more body sheets as shown in Fig. 12. Here the mesh construction of Fig. 10 is disposed between two body sheets 57 and 58. This platform preferably has the various elements adhered to each other as by cementing the sheets to the runs of tensile material and by cementing the interfaces of the two sheets together. Of course, the mesh construction, as shown in Fig. 10, may be used with a single body sheet applied to one side thereof.

I claim:

1. An upholstered article, such as a seat, a mattress, or the like comprising, an underlying spring structure and an overlying padding, a platform disposed between the spring structure and the padding to protect the padding including, two body sheets, each composed of at least one sheet of elastic plastic material, and a plurality of flexible plastic filaments having elastic characteristics disposed between the body sheets, said filaments being spaced from each other, the facing surfaces of the sheets and the filaments therebetween being adhered together to maintain the spacing of the filaments and to hold the filaments against lengthwise displacement relative to the sheets, the elasticity of the body sheets and of the filaments accommodating flexing action of the underlying spring structure.

2. An upholstered article such as a seat, a mattress, or the like comprising, an underlying spring structure and an overlying padding, a platform disposed between the spring structure and the padding to protect the padding including, a sheet body comprised of elastic sheet plastic material and a plurality of flexible plastic filaments having elastic characteristics extending along the sheet body in spaced relationship, the said sheet body and the filaments being united to maintain the spacing of the filaments and to hold the filaments against lengthwise displacement relative to the sheet body, the elasticity of the sheet body and of the filaments accommodating flexing action of the underlying spring structure.

ALEXANDER H. DEWEES.

References Cited in the file of this patent

UNITED STATES PATENTS

| Number | Name | Date |
|---|---|---|
| 1,460,392 | Schenkelberger | July 3, 1923 |
| 1,967,700 | Angier | July 24, 1934 |
| 2,008,158 | Van Dresser | July 16, 1935 |
| 2,125,838 | Stark | Aug. 2, 1938 |
| 2,281,635 | Strauss | May 5, 1942 |
| 2,430,612 | Heuer | Nov. 11, 1947 |
| 2,567,330 | Gagnier | Sept. 11, 1951 |
| 2,580,202 | Talalay et al. | Dec. 25, 1951 |